United States Patent [19]
Hayashida et al.

[11] Patent Number: 4,793,839
[45] Date of Patent: Dec. 27, 1988

[54] ARRANGEMENT OF CANISTER-USED EMISSON CONTROL SYSTEM IN MOTOR VEHICLE

[75] Inventors: Tsutomu Hayashida, Sagamihara; Yutaka Shibamoto, Atsugi; Tomiharu Yamada; Tetsuro Kondo, both of Isehara, all of Japan

[73] Assignee: Nissan Motor Co., Ltd., Yokohama, Japan

[21] Appl. No.: 127,427

[22] Filed: Dec. 2, 1987

[30] Foreign Application Priority Data

Dec. 5, 1986 [JP] Japan ................................ 61-290270

[51] Int. Cl.⁴ ............................................. B01D 50/00
[52] U.S. Cl. ..................................... 55/385.3; 55/387; 123/519; 280/5 A
[58] Field of Search ..................... 55/387, 316, 385 B; 123/519; 280/5 A

[56] References Cited
U.S. PATENT DOCUMENTS 4,369,981  1/1983  Chiba et al. .......................... 280/5 A
4,457,525  7/1984  Tanaka et al. ....................... 280/5 A

FOREIGN PATENT DOCUMENTS 23348   2/1980  Japan ................................... 123/520
291218  12/1986 Japan ................................... 280/5 A Primary Examiner—Benard Nozick
Attorney, Agent, or Firm—Foley & Lardner, Schwartz, Jeffery, Schwaab, Mack, Blumenthal & Evans

[57] ABSTRACT

Herein disclosed is an arrangement of a canister-used emission control system in a motor vehicle. The canister is positioned within a safety zone which is enclosed by mechanically rigid members of the motor vehicle.

8 Claims, 3 Drawing Sheets

ARRANGEMENT OF CANISTER-USED EMISSON CONTROL SYSTEM IN MOTOR VEHICLE

BACKGROUND OF THE INVENTION

1. Field of the Invention

The present invention relates in general to an arrangement of an emission control system in a motor vehicle, and more particularly to an arrangement of an emission control system of a type which includes an activated charcoal canister.

2. Description of the Prior Art

In order to prevent the escape of fuel vapors from the fuel tank and the intake system of an internal combustion engine, evaporative emission control systems (EECS) have been widely employed in modern motor vehicles. In the systems, an activated charcoal canister is used to trap the vapors when the engine is shut off. Upon restarting, a flow of filtered air through the canister purges the vapors from the canister. The vapors go through one or more tubes (purge line) feeding into an induction passage downstream of a throttle valve of the intake system, and they are burnt in the engine.

However, the evaporative emission control systems hitherto proposed fail to prevent the escase of fuel vapors when the fuel tank is under feeding. In fact, during the feeding, fuel vapors escape from a mouth of a fuel filler tube.

In order to suppress or at least minimize this undesired matter, a measure of using an extra canister has been proposed, which is disclosed in Japanese Utility Model First Provisional Publication No. 50-3119.

This measure will be outlined in the following with reference to the drawings, particularly to FIG. 6 of the attached drawings.

Numeral 1 denotes a fuel tank in which fuel (gasoline or the like) is contained in the tank 12. An evaporation tube 3 extending from an activated charcoal canister 5 is connected to the ceiling of the fuel tank 1 and exposed to the space above the fuel, so that fuel vapors produced in the tank 1 flow in the tube 3 and is trapped by the canister 5. Upon restarting of an associated engine, the vapors in the canister 5 are purged by a flow of filtered air therethrough and fed to an intake system of the engine through a feeding tube 5a. Denoted by numeral 4 is a ventilation tube which has one end projected into the fuel tank 1 and the other end connected to another activated charcoal canister 6. The canister 6 has a discharging tube 6a which is led to an open air. Thus, vapor-contained air led to the ventilation tube 4 is cleaned by the canister 6 before discharging into the open air. A fuel filler tube 2 is connected at its lower end to a lower portion of the fuel tank 1. A fuel inlet opening 2a of the fuel filler tube 2 is equipped with a suitable seal device which is constructed to suppress or at least minimize the escape of fuel vapors when a fuel feeding is being carried out with a fuel feeding gun 7.

Upon mounting, the canister 5 is mounted in an engine room of the motor vehicle and the other canister 6 is mounted in a rear portion of the vehicle where the fuel tank 1 is arranged.

Howver, the above-mentioned emission control system still has the following drawbacks originating from the position where the canister 6 is placed.

That is, usually, the mechanical strength of the rear portion of the vehicle body is considerably poor as compared with that of the engine room. Mounting the canister 6 to such a mechanically poor portion induces a considerable possibility of damaging or collapsing the canister 6 upon a vehicle collision, particularly when the vehicle is struck from behind. The collapse of the canister is quite dangerous because it may bring about a fire.

SUMMARY OF THE INVENTION

It is therefore an object of the present invention to provide in a motor vehicle an improved arrangement of a canister-used emission control system which is free of the above-mentioned drawbacks.

According to the present invention, there is provided an arrangement of a canister-used emission control system wherein the canister is positioned in a safety zone which is enclosed by mechanically strengthened members of a motor vehicle.

According to the present invention, there is provided an improved emission control system in a motor vehicle. The vehicle has a floor panel, a fuel tank mounted beneath the floor panel, two side members welded to lateral sides of the floor panel and extending along the same and a circular spare tire container defined by the floor panel. The emission control system comprises an activated charcoal canister arranged beneath the floor panel; a bracket secured to the floor panel; means for detachably connecting the canister to the bracket; and a fuel vapor conveying tube extending from the fuel tank to the canister, wherein the canister is positioned within a given zone which is defined between selected one of the side members and the spare tire container.

DETAILED DESCRIPTION OF THE INVENTION

Figure 1:
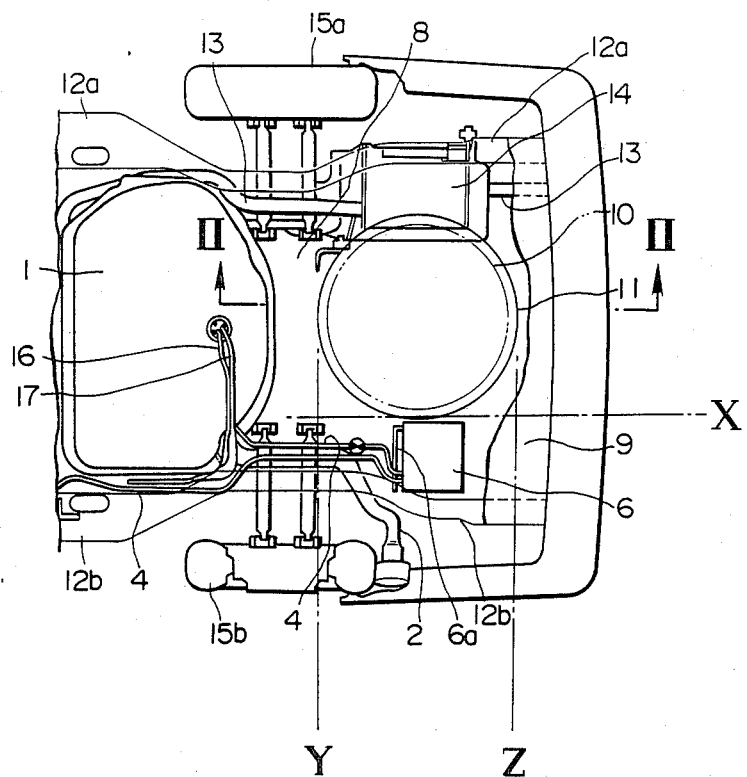
FIG. 1 is a plan view of a rear portion of a motor vehicle, to which the present invention is practically applied.
Figure 2:
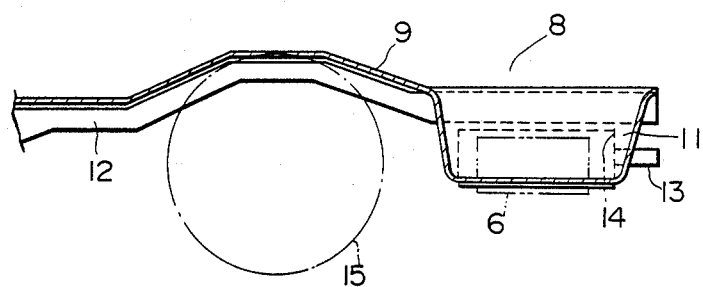
FIG. 2 is a sectional view taken along the line II—II of FIG. 1.

Referring to FIG. 1 of the drawings, there is shown a plan view of a rear portion of a motor vehicle, to which the present invention is practically applied.

Designated by numeral 8 is the portion where a trunk room is defined. Rear wheels 15a and 15b are arranged at both sides of a rear floor panel 9. A circular tire container 11 is defined by the rear floor panel 9 for receiving therein a spare tire 10. In front of the tire container 11, there is arranged a fuel tank 1 which is mounted beneath the floor panel 9.

Two elongate side members 12a and 12b are welded to lateral sides of the floor panel 9, extending along the same, as shown in the drawings. Each side member 12a or 12b has a generally rectangular cross section for increased mechanical strength thereof. Extending along the longitudinal direction of the vehicle near the side member 12a is an exhaust tube 13 which is equipped with a muffler 14 at its downstream portion.

A fuel filler tube 2 is connected to the fuel tank 1 for feeding the tank 1 with fuel. Extending from the fuel tank 1 are suction and return tubes 16 and 17 which are led to an induction system of an engine mounted in a front portion (viz., engine room) of the vehicle. With these tubes, fuel supply from the fuel tank 1 to the engine is carried out. Although not illustrated in the drawing, an evaporation tube extends from the fuel tank 1 to an activated charcoal canister mounted in the engine room.

Another activated charcoal canister 6 is further employed, which is arranged near the side member 12b and connected to the rear floor panel 9 through a bracket "B" which will be described in detail hereinafter. As is understood from FIGS. 1 and 3, the canister 6 is constructed to have an oval cross section and arranged to lie in parallel with the longitudinal axis of the vehicle.

The canister 6 is positioned within a given zone defined between the rigid side member 12b and the tire container 11. More specifically, the canister 6 is positioned within a safety zone which is enclosed by the side member 12b, a tangent line "X" at the leftmost side of the tire container 11, a tangent line "Y" at the frontmost side of the same and a tangent line "Z" at the rearmost side of the same.

A ventilation tube 4 extends from a neck portion of the fuel filler tube 2 to the canister 6 from which a discharge tube 6a extends to an open air. If desired, the purge air opening of the canister 6 may be used as a substitute for the discharge tube 6a. Of course, in this case, the discharge tube 6a can be removed.

Figure 3:
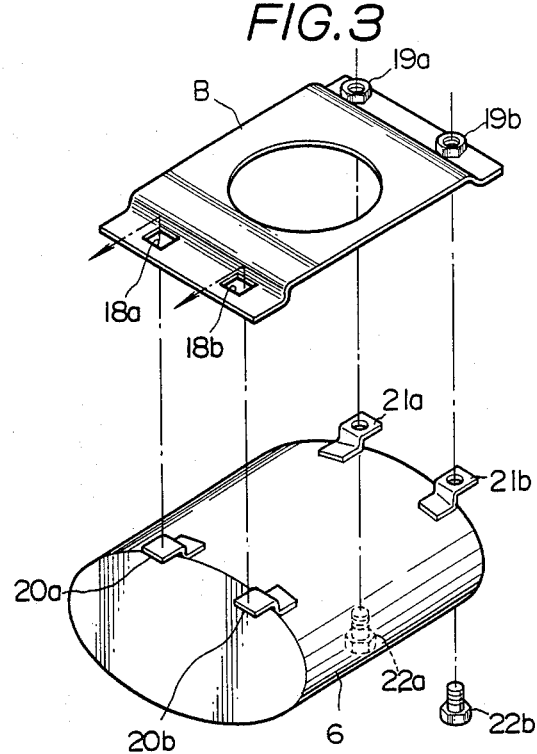
FIG. 3 is a perspective view of a canister and a bracket which are in a disassembled condition.
Figure 4:
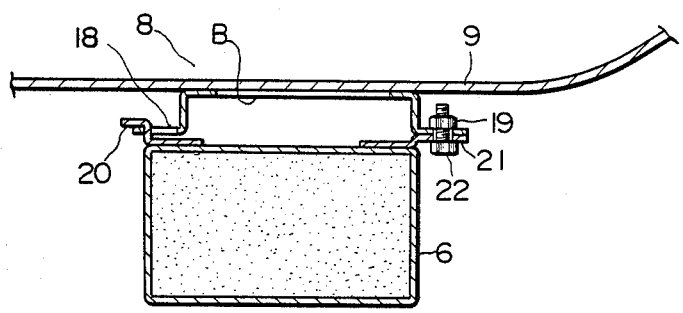
FIG. 4 is a sectional view of the canister and the bracket in an assembled condition.

Referring to FIGS. 3 and 4, there is shown the manner for detachably mounting the canister 6 to the rear floor panel 9.

A rectangular bracket "B" is used, which is welded at its major portion to the floor panel 9b and has flanges at its longitudinally opposed ends. One flange is formed with two rectangular openings 18a and 18b, while the other flange is formed with two circular openings to which respective nuts 19a and 19b welded to the flange are mated. The canister 6 has two pairs of lugs 20a, 20b, 21a and 21b welded thereto. The lugs 21a and 21b are formed with circular openings respectively.

Upon mounting, the lugs 20a and 20b of the canister 6 are put into the rectangular openings 18a and 18b of the bracket "B" having the other lugs 21a and 21b mated with the nuts 19a and 19b of the bracket "B". Then, two bolts 22a and 22b are screwed to the mated lugs 21a and 21b and nuts 19a and 19b to tightly fasten the canister 6 to the bracket "B".

As is described hereinabove, the canister 6 is positioned within the given zone which is enclosed by the side member 12b, and the tangent lines "X", "Y" and "Z". This means that the canister 6 is placed in a relatively safe zone enclosed by the mechanically rigid parts or structures arranged in the rear portion of the vehicle. Thus, the possibility of breaking the canister 6 upon a vehicle collision is assuredly lowered or at least minimized.

Figure 5:
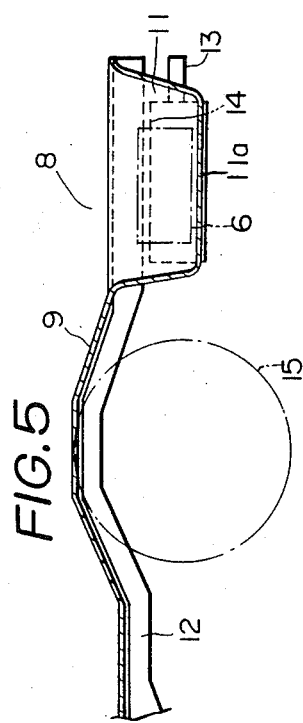
FIG. 5 is a sectional view similar to FIG. 2, but showing a modification of an arrangement of the present invention.
Figure 6:
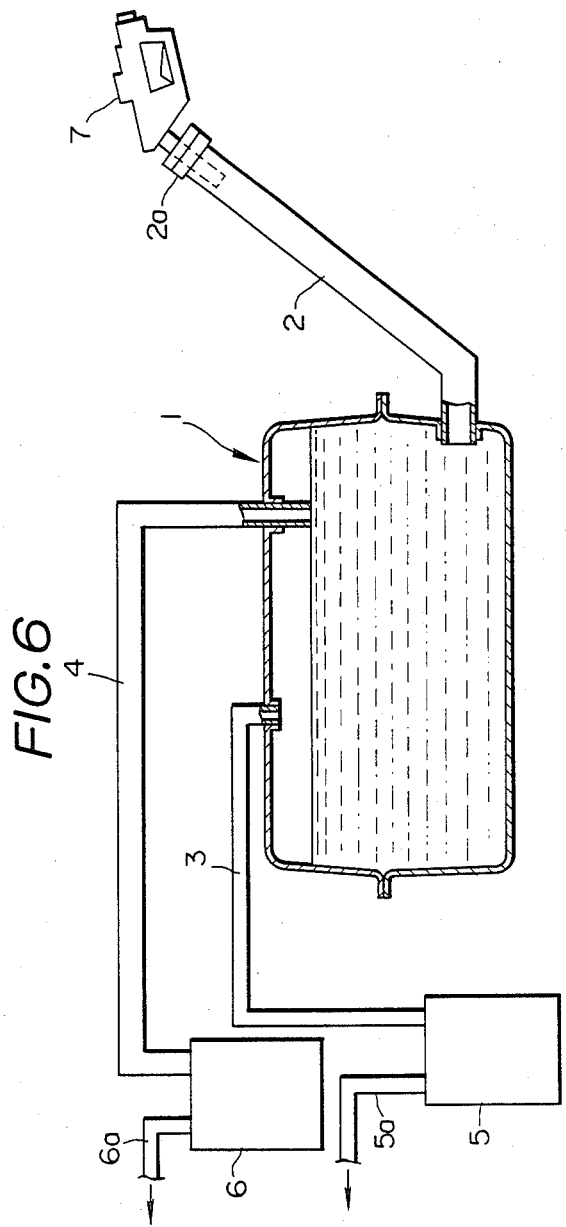
FIG. 6 is a schematic illustration of a conventional emission control system using two canisters.

Referring to FIG. 5, there is shown a modification of the arrangement of the present invention. In this modification, the canister 6 is positioned above the bottom portion 11a of the tire container 11, so that the canister 6 is protected from colliding against a road surface even when the vehicle bounds greatly during its cruising.

What is claimed is:

1. In a motor vehicle having a floor panel, a fuel tank mounted beneath the floor panel, two side members welded to lateral sides of said floor panel and extending along the same and a circular spare tire container defined by said floor panel,
an emission control system comprising:
   an activated charcoal canister arranged beneath said floor panel;
   a bracket secured to said floor panel;
   means for detachably connecting said canister to said bracket; and
   a fuel vapor conveying tube extending from said fuel tank to said canister,
   wherein said canister is positioned within a given zone which is defined between selected one of said side members and said spare tire container.

2. A motor vehicle according to claim 1 in which said means for detachably connecting said canister to said bracket comprises:
   two flanges integrally formed on said bracket, one flange being formed with two openings and the other flange being provided with two nuts welded thereto;
   two pairs of lugs fixed to said canister; and
   two bolts,
   wherein upon assembly, one pair of said lugs are put into said openings of the flange having the other pair of lugs mated with said nuts of the other flange and said bolts are engaged with said nuts to fasten said canister to said bracket.

3. A motor vehicle as set forth in claim 1 further comprising:
   another activated charcoal canister arranged at a position distant from said fuel tank; and
   another fuel vapor conveying tube extending from said fuel tank to said another canister.

4. A motor vehicle as set forth in claim 1 further comprising a discharge tube which extends from said canister to the open air.

5. A motor vehicle as set forth in claim 1 in which said canister has an opening through which ventilation air is fed into said canister.

6. A motor vehicle as set forth in claim 1 in which said fuel vapor conveying tube has one end connected to a neck portion of a fuel filler tube connected to said fuel tank.

7. A motor vehicle as set forth in claim 1 wherein said given zone is enclosed by the side member, a first tangent line which touches one lateral side of said spare tire container, a second tangent line which touches the frontmost side of the same and a third tangent line which touches the rearmost side of the same, said one lateral side of said spare tire container being positioned near the selected side member.

8. A motor vehicle as set forth in claim 7 wherein said canister is constructed to have an oval cross section, and wherein said canister is arranged to lie in parallel with the longitudinal axis of said floor panel.

* * * * *